United States Patent
Hennes

(10) Patent No.: US 7,490,974 B2
(45) Date of Patent: Feb. 17, 2009

(54) SCREW EXTRUSION PRESS AND METHOD WITH MIXING RINGS HAVING PASSAGES

(75) Inventor: Jochen Hennes, Frankfurt (DE)

(73) Assignee: Kiefel Extrusion GmbH, Worms (DE)

( * ) Notice: Subject to any disclaimer, the term of this patent is extended or adjusted under 35 U.S.C. 154(b) by 0 days.

(21) Appl. No.: 11/800,788

(22) Filed: May 7, 2007

(65) Prior Publication Data

US 2007/0263479 A1   Nov. 15, 2007

(30) Foreign Application Priority Data

May 11, 2006   (DE)   ......................... 10 2006 022 123

(51) Int. Cl.
  *B29B 7/42*   (2006.01)
  *B29C 47/64*   (2006.01)
(52) U.S. Cl. ......................................................... 366/82
(58) Field of Classification Search .................... 366/79, 366/81–85, 301, 318–324; 425/204, 208, 425/209

See application file for complete search history.

(56) References Cited

U.S. PATENT DOCUMENTS

| 3,719,351 A | 3/1973 | Upmeier |
| 4,015,833 A | 4/1977 | Kim |
| 5,234,656 A | 8/1993 | Kniss |
| 5,630,968 A * | 5/1997 | Wang et al. .................... 264/53 |
| 2007/0263479 A1 * | 11/2007 | Hennes ......................... 366/82 |

FOREIGN PATENT DOCUMENTS

| DE | 2 023 910 | 2/1972 |
| DE | 3245084 A1 * | 6/1984 |
| DE | 38 43 576 A1 | 7/1990 |
| DE | 100 00 938 A1 | 7/2000 |

* cited by examiner

*Primary Examiner*—Charles E Cooley
(74) *Attorney, Agent, or Firm*—Collard & Roe, P.C.

(57) ABSTRACT

A screw extrusion press for processing thermoplastic and not reticulating polymers comprises a conveying screw (1) in a cylinder (2). The screw comprises a conveying zone (7) and a mixing zone with 10 mixing rings (3). These mixing rings comprise a passage hole (5) that extends from the bottom (10) of the screw to the vicinity of the cylinder wall (20) where it opens out into a shear gap (9).

16 Claims, 1 Drawing Sheet

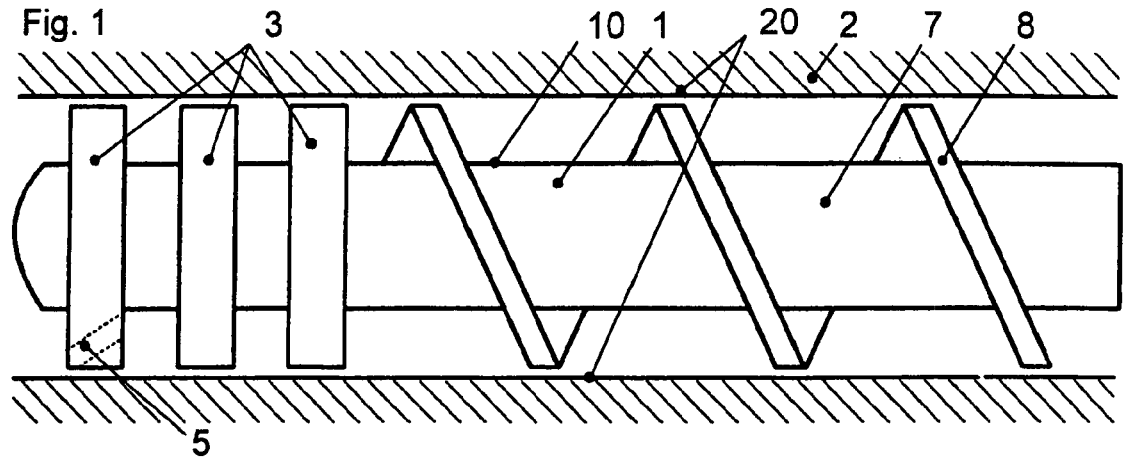
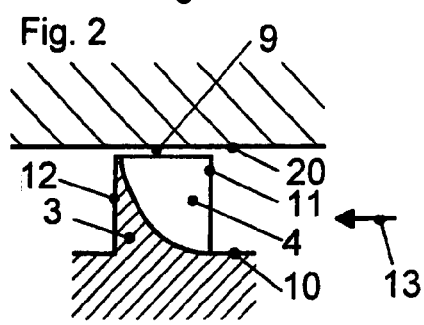
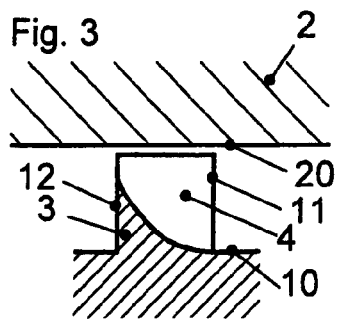
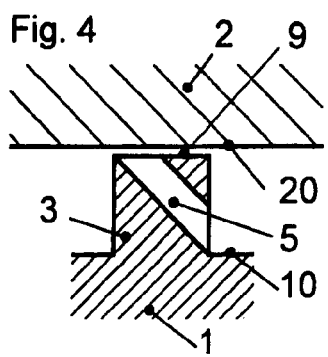
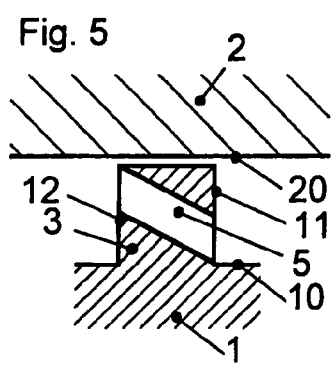
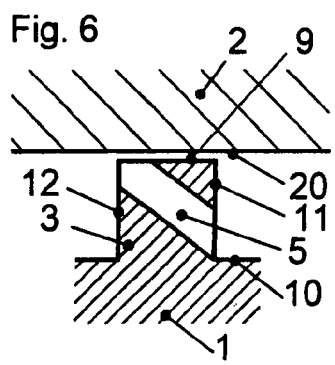
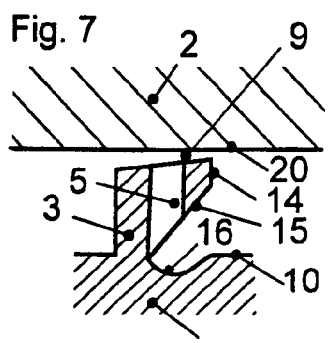
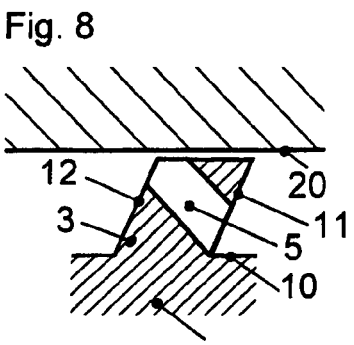
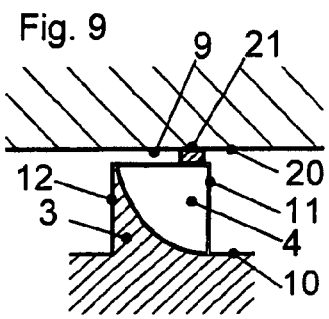

SCREW EXTRUSION PRESS AND METHOD WITH MIXING RINGS HAVING PASSAGES

CROSS REFERENCE TO RELATED APPLICATIONS

Applicant claims priority under 35 U.S.C. §119 of German Application No. 10 2006 022 123.0 filed May 11, 2006.

BACKGROUND OF THE INVENTION

1. Field of the Invention

The invention relates to a screw extrusion press for processing thermoplastic and not reticulating polymers the conveying screw of which comprises a conveying zone and a mixing zone with at least one mixing ring that extends from the bottom of the screw to the wall of the cylinder and is provided with at least two passage holes.

2. Description of the Related Art

A screw extrusion press of this type is known from DE 2 023 910. There, passage holes extend alternately from the bottom of the screw diagonally to a region near the cylinder and vice versa. In spite of this great construction expense, the homogenization of the molten mass is not satisfactory, this being in particular due to the shape of the passage holes leading from the region near the cylinder to the bottom of the screw. The molten mass is thereby conveyed from a region having a high circumferential speed to a region with a very low circumferential speed at the bottom of the screw, this conflicting with good mixing and homogenization.

The document DE 100 00 938 A1 shows a rotor in a housing with a ring package consisting of mixing rings and partition rings. The mixing rings have grooves on the inflow side, each of said grooves running toward an axially extending channel in the perimeter region of the mixing rings. The partition rings also have longitudinal grooves on their circumference. The mixing grooves and the longitudinal grooves are each limited by the wall of the housing. Transport of the molten plastic occurs through the diverse grooves and bores.

The DE 38 43 576 A1 shows a conveying screw in an extruder. On the conveying screw, there are ring-shaped mixing elements comprising multiple bores leading at an angle to the longitudinal axis of the extruder from the inflow side to the outflow side of the rings. The molten granulate is mixed and in parts conveyed through these bores.

SUMMARY OF THE INVENTION

Another conveying screw is known from U.S. Pat. No. 4,015,833.

It is the object of the invention to improve homogenization in the mixing region of the screw extrusion press.

In view of a screw extrusion press of the type mentioned herein above, this object is solved in that the at least two passage holes extend from the bottom of the screw or from the vicinity thereof toward the wall of the cylinder.

According to a first aspect of the invention, this object is solved by a screw extrusion press according to the preamble of the main claim in which, between an outer perimeter wall of the mixing ring and the cylinder wall, there is formed a shear gap and in which at least one passage hole extends from the bottom of the screw or from the vicinity thereof and opens out at least in parts in said shear gap.

The invention relies on the observation that, if the molten mass is conveyed from a region near the bottom of the screw on the inflow side of a mixing ring into a region near the cylinder, the circumferential speed of the molten mass exiting the passage hole increases abruptly, which contributes to good distribution and, as a result thereof, to good homogenization. An essential fundamental principle of the invention is that the molten mass is accelerated through the passage holes from the bottom of the screw to the wall of the cylinder. The exiting flows are then twisted together in a certain manner by the rotation of the mixing ring so that the mixing effect occurring is particularly strong and the homogenization particularly good as a result thereof.

Since a shear gap is formed between the outer perimeter wall of the mixing ring and the cylinder wall, the mixing effect of the conveyed molten mass is considerably increased.

Since at least one passage hole, more specifically a groove or a bore, opens out at least in parts into the shear gap, the conveyed mass is forcibly brought into the shear gap when the screw extrusion press is in operation. Only then will the shear gap achieve the intended effect.

In practice the term shear gap is understood to refer to a gap having a radial width of more than 0.3 mm, in most cases of more than 0.5 mm. The invention has moreover put prototypes into operation in which the radial width of the shear gap was approximately 1/50 the size of the extruder, said shear gap namely having, on a 50 mm extruder, a gap width of about 1 mm and on a 100 mm extruder a gap width of about 2 mm. As contrasted thereto, a seal gap has a smaller radial width. Usually, the width of a seal gap is about one tenth of a mm.

It may hereby be advantageous if the shear gap varies in height in the direction of the flow, so that the speed is different at different points, this always leading to increased mixing.

It may however also be advantageous to seal the shear gap on the inflow side of the mixing ring, more particularly when at least part of the passage holes is formed by the shear gap, meaning when the passage hole ends at least partially in the shear gap. The molten mass coming from the bottom of the screw is particularly strongly accelerated in the circumferential direction, which has a particularly advantageous effect when the shear gap is sealed on the inflow side.

In another advantageous embodiment of the invention, there is provided that the passage hole comprises a groove that is open on the inflow side of the mixing ring and that opens out into the shear gap on the outflow side. Through this configuration, the molten mass conveyed radially outward in this open groove is particularly strongly split and accelerated in the shear gap into which it opens out, which leads to a good mixing result in the circumferential direction and also in the conveying direction of the screw.

This effect is also substantially achieved if the passage hole comprises a groove that is open on the inflow side of the mixing ring and is partially closed on the outflow side, meaning that part of the molten mass flowing in the groove reaches the end region of the shear gap.

In order to allow for adjusting the mixing effect within the passage hole to the respective molten mass and also to vary the mixing effect, it is advantageous if, in another implementation of the invention, the cross section of the passage hole varies with regard to both its size and its shape in the flow direction. As a result, acceleration forces may alternate with deceleration forces, which promotes the mixing effect.

It is often advantageous if the cross section of the passage hole decreases in the direction of the flow, which causes the flow velocity of the molten mass in the passage hole to increase in the direction of the flow.

Usually, a mixing ring for a screw extrusion press does not only comprise one single passage hole; as a rule it rather includes a plurality of passage holes. In view of such an embodiment, it is advantageous that, when a plurality of passage holes are spaced on the circumference of a mixing ring, these passage holes vary in cross section and shape about the circumference so that the individual flows exit the passage holes and come into touching contact with each other on the outflow side of the mixing ring at different speeds, which advantageously influences the mixing of the entire volume. It is understood that grooves and bores may also be utilized together. Moreover, it is understood that bores having a design different from those in accordance with the present invention may be utilized together with the passage holes of the invention.

In a frequent implementation of the invention, there is provided that the passage hole, when viewed in the direction of the flow, extends at an acute angle with respect to the axis of the screw. It may however also be advantageous to have the passage hole extending at right angles with respect to the axis of the screw when viewed in the direction of the flow, this being particularly advantageous if the passage hole opens out in the region of a shear gap flaring in the direction of the flow. The molten mass exiting the passage hole is thereby very strongly divided or separated as a result of the high circumferential speed in the region of the shear gap.

If, in another implementation of the invention, the passage hole is configured to be a bore, this especially offers advantages in the manufacturing of the mixing rings since a bore is generally easier to implement as other cross sectional shapes of the passage holes.

The bore may thereby end in the outflow side of the mixing ring, in the shear gap or partly in the shear gap and partly in the outflow side of the mixing ring.

If, in another implementation of the invention, the wall margins on the inflow side and on the outflow side of a mixing ring are inclined at an angle different from the right angle with respect to the axis of symmetry of the screw extrusion press, this may also influence the mixing behaviour.

If a plurality of mixing rings are disposed in a screw extrusion press, these mixing rings may be configured individually, meaning that each mixing ring may have a structure different from the next one. It is understood that each type of configuration of the discrete mixing rings is possible independent of the neighbouring ones. Like mixing rings may however also alternate.

BRIEF DESCRIPTION OF THE DRAWINGS

The invention will be explained hereinafter with reference to a plurality of exemplary embodiments. In the drawing:

FIG. 1 shows a section through a cylinder arrangement of a screw extrusion press with a view of the screw; and FIGS. 2-9 show different sectional views of embodiments of a mixing ring.

DETAILED DESCRIPTION OF PREFERRED EMBODIMENTS

As shown in FIG. 1, a screw 1 is disposed in a cylinder 2 of a screw extrusion press, said screw comprising three mixing rings 3 and a conveying zone 7 with individual screw channels 8. The mixing rings 3 extend from the bottom of the screw, which is indicated at 10, to a shear gap 9 at the wall indicated at 20 of the cylinder 2. The width of the shear gap 9 may for example be about 1 mm in the radial dimension.

According to FIG. 2, a mixing ring 3 comprises a groove 4 that commences at the bottom 10 of the screw and extends as far as the shear gap 9. The groove on the inflow side 11 of the mixing ring 3 is thereby completely open, whilst the outflow side 12 is closed except for the shear gap 9. The flow direction of the molten mass is indicated at 13.

In the implementation shown in FIG. 3, the groove 4, which is milled in the radial direction, is completely open on the inflow side 11 and partly closed on the outflow side 12 so that here the molten mass comprises a larger outflow cross section than in the implementation according to FIG. 2, where only the shear gap 9 remains to form the outflow port.

Although the reference numeral 4 indicates a groove in the special case, it is understood to refer generally to a passage hole of any configuration.

In the embodiments shown in the FIGS. 4 through 8, one passage hole is configured to be a bore 5.

FIG. 4 shows an oblique arrangement of the bore 5 extending from the bottom 10 of the screw as far as the shear gap 9. Accordingly, this bore ends in the perimeter region of the mixing ring 3.

In the illustration shown in FIG. 5, the bore 5 ends on the outflow side 12. Here also, the bore commences at the bottom 10 of the screw on the inflow side 11. It is noted though, that the bore 5 shown in FIG. 5 constitutes an additional bore that is configured on the mixing ring 3. On same mixing ring there is also provided a passage hole (not shown), which opens out at least partially in the shear gap.

In FIG. 6, the bore ends partly on the outflow side 12 and partly in the shear gap 9, with the bore 5 again commencing at the bottom 10 of the screw on the inflow side 11.

Another variant may be achieved in that the sectioned portion shown on the top right side of FIG. 6 and which bounds the flow channel 5 toward the shear gap is advanced radially outward or is provided with a projection extending radially outward so that the shear gap 9 is configured to be very narrow toward the inflow side 11, more specifically even sealing it. This may for example be achieved in that the shear gap is so restricted there that it acts as a seal gap. In such a configuration, when viewed in the direction of the flowing molten mass, meaning from the inflow side 11 to the outflow side 12, there is first provided a seal gap (not shown) on the circumference of the mixing ring, and then, further downstream, a shear gap 9 into which the passage hole opens out.

FIG. 7 shows an inflow side comprising, in its upper part, a portion 14 extending at right angles to the screw axis and a portion 15 extending at an incline to the screw axis. The bottom of the screw is provided with a notch 16 from which the bore 5 extends at right angles to the screw axis and ends in the shear gap 9 which comprises a flaring portion 6 when viewed in the flow direction.

In the illustration shown in FIG. 8, the mixing ring 3 is inclined with respect to the screw axis, meaning that the inflow side 11 is inclined at an acute angle with respect to the axis of symmetry of the screw, whilst the outflow side 12 is inclined at an obtuse angle with respect to the axis of symmetry of the screw. In this exemplary embodiment, the bore 5 extends from the bottom 10 of the screw at an incline to the wall 20 of the cylinder, part of the bore ending in the shear gap 9 and another part of the bore ending on the outflow side 12.

FIG. 9 shows a configuration of the mixing ring according to FIG. 2 in which, on the inflow side, the shear gap, which is slightly larger than the shear gap 9 in FIG. 2, is closed with a sealing ring 21 so that the shear gap 9 remaining for the molten mass is shorter.

The invention claimed is:

1. A screw extrusion press for processing thermoplastic and not reticulating polymers, with a conveying screw (1) in a cylinder, said conveying screw (1) having a conveying zone (7) and a mixing zone with a mixing ring (3) that extends from a bottom (10) of the screw to a wall (20) of the cylinder, said mixing ring (3) comprising passage holes (4, 5), wherein a shear gap (9) is formed between an outer perimeter wall of the mixing ring (3) and the cylinder wall (20) and wherein at least one passage hole (4, 5) extends from the bottom (10) of the screw or from the vicinity thereof and opens out, at least in part, in said shear gap (9), said at least one passage hole (4, 5) being at least partially closed on an outflow side (12) of said mixing ring (3), thereby conveying and accelerating molten mass from the bottom (10) of the screw (1) to the cylinder wall (20) into said shear gap (9).

2. The screw extrusion press as set forth in claim 1, wherein the shear gap (9) varies in height (6) in the flow direction.

3. The screw extrusion press as set forth in claim 1, wherein the shear gap is sealed (21) on an inflow side (11) of the mixing ring (3).

4. The screw extrusion press as set forth in claim 1, wherein the passage hole (4) comprises a groove (5) that is open on an inflow side (11) of the mixing ring (3) and that opens out into the shear gap on an outflow side (12).

5. The screw extrusion press as set forth in claim 1, wherein the passage hole (4) comprises a groove (5) that is open on an inflow side (11) of the mixing ring (3) and that is partially closed on an outflow side (12).

6. The screw extrusion press as set forth in claim 1, wherein a cross section of the passage hole (4) varies with regard to both its size and its shape in the flow direction.

7. The screw extrusion press as set forth in claim 1, wherein a cross section of the passage hole (4) decreases in the flow direction.

8. The screw extrusion press as set forth in claim 1, wherein when a plurality of passage holes (4) are spaced on a circumference of a mixing ring (3), these passage holes vary in cross section and shape about the circumference.

9. The screw extrusion press as set forth in claim 1, wherein the passage hole (4, 5) extends at an acute angle with respect to an axis of the screw when viewed in the flow direction.

10. The screw extrusion press as set forth in claim 1, wherein the passage hole (4, 5) extends at right angles with respect to an axis of the screw when viewed in the direction of the flow.

11. The screw extrusion press as set forth in claim 1, wherein a passage hole is configured to be a bore (5).

12. The screw extrusion press as set forth in claim 11, wherein the bore (5) opens out into the shear gap (9).

13. The screw extrusion press as set forth in claim 12, wherein the bore (5) ends in parts in the shear gap (9) and in parts on the outflow side (12) of the mixing ring (3).

14. The screw extrusion press as set forth in claim 1, wherein wall margins on the inflow side (11) and on the outflow side (12) of a mixing ring (3) are inclined at an angle different from the right angle with respect to an axis of symmetry of the screw extrusion press (1).

15. The screw extrusion press as set forth in claim 1, wherein a plurality of mixing rings (3) are arranged on a screw extrusion press (1), the mixing rings (3) having different configurations.

16. A method of conveying and mixing a thermoplastic and not reticulating polymer, using a screw extrusion press with a conveying screw (1) in a cylinder, the conveying screw (1) having a conveying zone and a mixing zone with a mixing ring (3) being utilized for conveying and mixing, said mixing ring (3) extending from a bottom (10) of the screw to a cylinder wall (20) of the screw extrusion press and the polymers being mixed by conveying them through passage holes (4, 5) on the mixing ring (3), wherein the polymers are conveyed through at least one passage hole toward a shear gap and flow axially past at least part of the mixing ring (3) along the shear gap (9), said shear gap being formed between an outer perimeter wall of the mixing ring (3) and the cylinder wall (20), said at least one passage hole (4, 5) being at least partially closed on an outflow side (12) of said mixing ring (3), thereby conveying and accelerating molten mass from the bottom (10) of the screw (1) to the cylinder wall (20) into said shear gap (9).

\* \* \* \* \*